Nov. 10, 1942.   C. J. JENNY   2,301,879
TEMPERATURE COMPENSATED PRESSURE RESPONSIVE INDICATING INSTRUMENT
Filed April 21, 1941   2 Sheets-Sheet 2
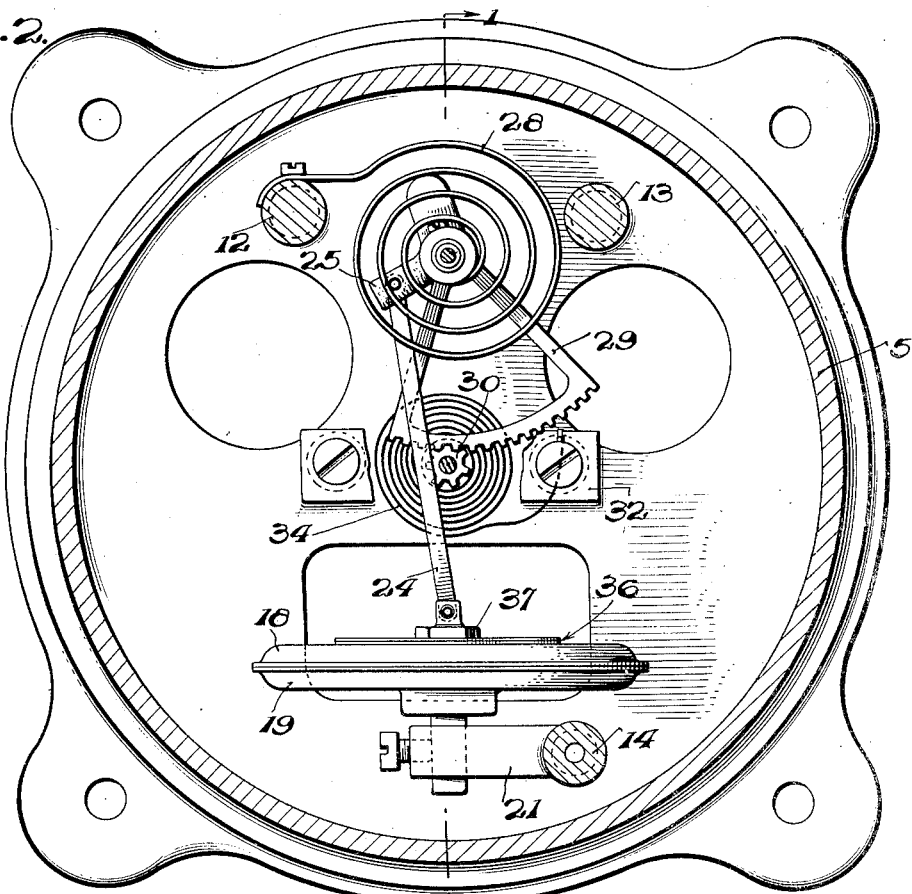
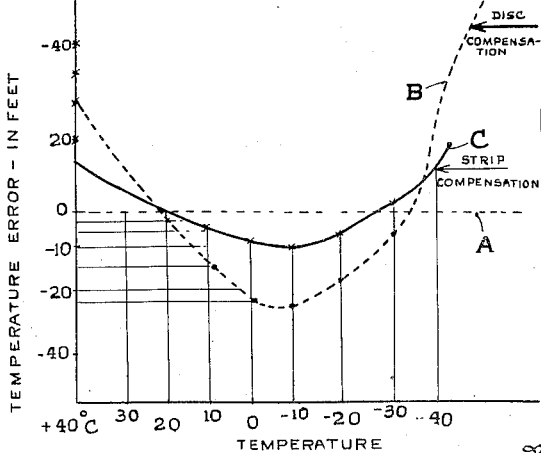
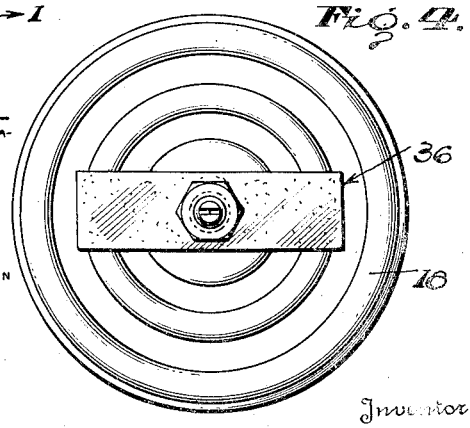
Inventor
Cletus J. Jenny.
By Cerstvik + Kalman.
Attorneys Patented Nov. 10, 1942

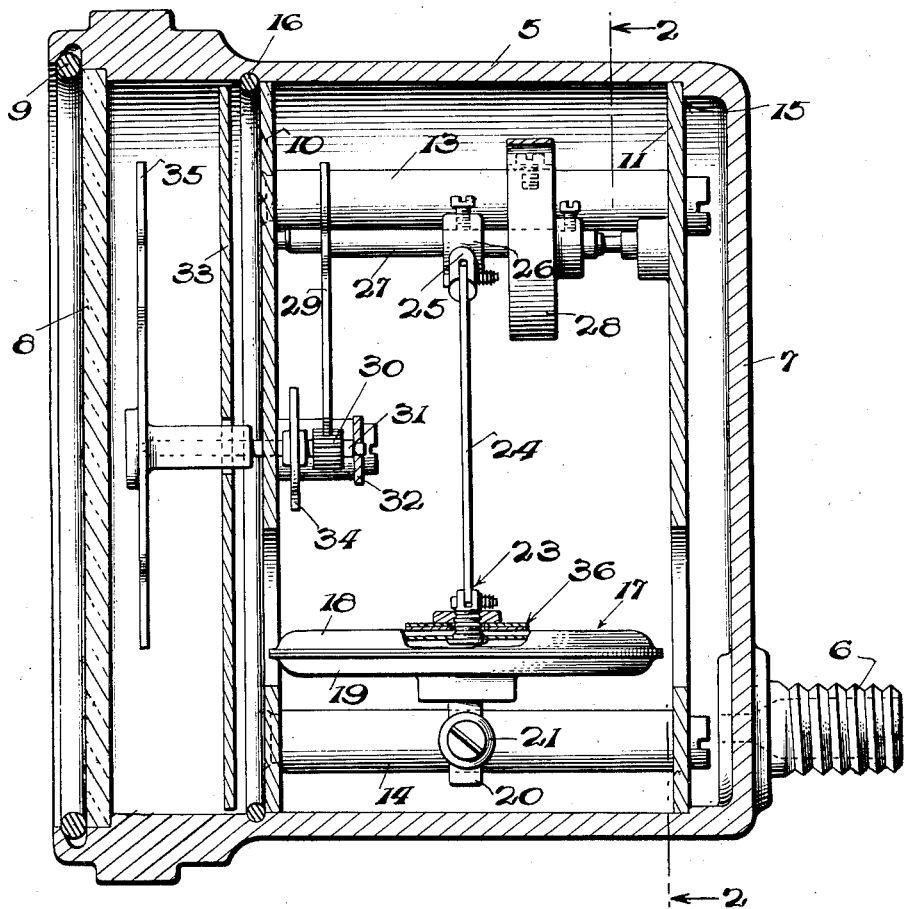

2,301,879

UNITED STATES PATENT OFFICE 2,301,879

TEMPERATURE COMPENSATED PRESSURE RESPONSIVE INDICATING INSTRUMENT

Cletus J. Jenny, East Orange, N. J., assignor to Bendix Aviation Corporation, Bendix, N. J., a corporation of Delaware Application April 21, 1941, Serial No. 389,682

5 Claims. (Cl. 137—157)

This invention relates to pressure responsive indicating instruments such as aneroid altimeters or barometers, manifold pressure gauges, aircraft air speed indicators, and aircraft rate of climb indicators, which use an expansible diaphragm device responding to changes in pressure or suction, and more particularly to means for compensating the effect of temperature on such instruments and their diaphragms.

As is well known in the art, pressure responsive indicating instruments used on aircraft, for example, are subject to temperature errors such as zero and range errors. Various means have heretofore been provided to accomplish both zero compensation and range compensation, the former to overcome errors resulting from the temperature effect upon the expansible diaphragm itself, and the latter for errors resulting from the temperature effect upon the frame, links, levers, gears, shafts and other parts of the instrument.

The problem of both zero and range compensation has been solved to a large extent, but not completely, by the use of a bi-metallic circular disc arranged on the center of the diaphragm with its outer periphery in intimate contact with the first corrugation of the diaphragm in the manner disclosed in Patent No. 2,235,110 issued March 18, 1941, to Frederick J. Ottley and assigned to the assignee of the present invention. It has been found, however, that the bi-metallic disc provided in the issued patent, by virtue of its very construction and shape, is incapable of exerting its maximum compensating effect upon the expansible diaphragm and thus provides a certain amount of error.

One of the objects of the present invention, therefore, is to provide novel temperature compensating means whereby the error introduced due to temperature effect will be practically completely eliminated.

Another object of the invention is to provide novel temperature compensation means for an expansible diaphragm device having a flexible wall in the form of a disc of flexible material which comprises an elongated temperature responsive element attached at its center to the center of the flexible wall.

A further object of the invention is to provide a novel temperature compensating means in the form of an elongated rectangular bi-metallic element attached at its center to the center of the expansible diaphragm and having its outer ends in intimate contact with the second corrugation of the diaphragm.

Still another object of the invention is to provide a novel temperature compensating element for expansible diaphragm devices to produce both range compensation and zero compensation, the element being relatively simple and easy to adjust.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration only and are not designed as a definition of the limits of the invention, reference being had for this purpose to the appended claims.

In the drawings wherein like reference characters refer to like parts throughout the several views, Figure 1 is a vertical longitudinal section of an indicating instrument embodying the novel temperature compensating means of the invention, the section being taken on line 1—1 of Figure 2;

Figure 2 is a vertical cross-section taken on line 2—2 of Figure 1;

Figure 3 is a detail section of a diaphragm device showing the novel temperature compensating means of the present invention attached thereto, together with the manner of adjusting the compensating means;

Figure 4 is a detail plan view of the diaphragm device shown in Figure 3; and,

Figure 5 illustrates a set of curves representing the operation and characteristics of the disc compensator and of the means constituting the subject matter of the present invention when subjected to varying temperatures.

To attain the objects of the invention, the diaphragm device to which the novel temperature compensating means is to be applied may comprise two flexible metal discs joined together at their peripheries to form an expansible and contractible chamber, or the device may comprise a single flexible disc joined at its peripheries to a rigid container to provide an expansible chamber having a single flexible wall.

Referring now to the drawings, and more particularly to Figures 1 and 2 thereof, the invention is shown applied to an aneroid diaphragm of an aircraft altimeter, for example. As shown, the altimeter comprises a casing 5 adapted for mounting on an instrument panel of an aircraft and provided with a threaded member 6 in the rear wall 7 for connecting the interior of the casing by a suitable conduit (not shown) to a point of static pressure on the aircraft.

The open end of the casing 5 is closed by suitable means such as a cover-glass 8 which is held in place by a resilient clamping ring 9 and through which the indicating means of the instrument may be viewed.

The operating mechanism of the instrument is carried by a frame work comprising a pair of spaced plates 10 and 11 held together by means of spacing rods 12, 13 and 14. The rear plate 11 is arranged to abut an internal circumferential ridge 15 provided within the casing 5, and the entire frame work is held rigidly in place within the casing by way of a suitable snap ring 16 which bears against the front plate 10.

The operating mechanism comprises, as illustrated, an expansible diaphragm device 17 which, in the present instance, is an aneroid which is evacuated and sealed so that as the atmospheric pressure decreases when the aircraft carrying the instrument climbs above the surface of the earth, the diaphragm device 17 is caused to expand due to the decreased pressure within the casing 5.

The device 17 is made up of two corrugated metal discs or diaphragms 18 and 19 (Figures 1 and 3) joined at their peripheries in any suitable manner as by soldering. A supporting post 20 is attached to the diaphragm 17 in order that the device 17 may be mounted on a fixed support such as an arm 21 carried by spacing rod 14.

A lug 22 is attached to the center of diaphragm 18 so that the expanding and contracting movements of device 17 may be utilized to actuate suitable indicating means. The outer end of the lug is forked as shown at 23 and has pivotally connected thereto one end of a link 24. The other end of link 24 is pivotally connected to a forked lever arm 25 by suitable means. A suitable collar 26 secured to a rock shaft 27 carries lever arm 25. The rock shaft in turn is journalled at its ends within suitable bearings provided in plates 10 and 11 so that it may oscillate upon actuation of lever arm 25 by link 24 when diaphragm device 17 expands and contracts.

A suitable coil spring 28 is provided encircling the rock shaft 27 so that upon expansion of the diaphragm device the rock shaft is rotated in one direction against the tension of the spring, and when the diaphragm device contracts, the rock shaft is rotated in the opposite direction by the spring, the outer end of which is anchored to spacing rod 12 and its inner end to the rock shaft 27.

Carried by and rotatable with the rock shaft 27 is a gear sector 29 which meshes with and drives a pinion 30 secured to a stub shaft 31, one end of which is journalled in plate 10 and the other end in a bracket 32 carried by plate 10. Stub shaft 31 projects through plate 10 and through a dial 33 and has secured at its free end a pointer 35 which cooperates with a suitable scale provided on dial 33.

A hair spring 34 is provided to take up the backlash between gear sector 29 and pinion 30, one end of the hair spring being connected to stub shaft 31 and the other end to the bracket 32.

It will now be apparent that as diaphragm device 17 expands and contracts due to either an increase or decrease in altitude, the pointer 35 is actuated thereby over dial 33, through the operating mechanism hereinabove described.

In calibrating pressure responsive instruments of the above type they are usually tested at room temperature (approximately 21° C. or 70° F.) and at a cold temperature of about −35° C. or −31° F. It has been found by actual experiment that in using the temperature compensating means such as the disc of Ottley referred to hereinabove, certain errors were introduced into the readings of the instrument, which, when plotted between 40° C. and −40° C. took the form such as that shown in dotted lines and designated at B in Figure 5 of the drawings. The ideal condition would be that the compensating means provide a corrective effect which defines substantially the dotted line designated at A of Figure 5, indicating complete elimination of the temperature error.

The errors found with the use of the disc compensator range from +26 feet at 40° C. in the readings to −26 feet at −10° C. and +53 feet at −45° C. The reasons for the variation in error with the use of the disc compensator are that by its circular construction the disc is incapable of exerting its maximum compensating effect upon the diaphragm wall because of the very structure of the metals used to make the disc. It has been found that by the use of a rectangular bi-metallic strip which contacts at its outer ends with the second corrugation of the diaphragm wall, a greatly improved result is reached and experimental data shows the error curve to have been substantially reduced to a form such as that shown in full lines at C in Figure 5. It will be noted that curve C follows more closely the ideal condition represented by the horizontal dotted line A than does dotted curve B representing the characteristics of a disc compensator.

Thus, bi-metallic strip 36 has been found by actual test, as indicated in the curves of Figure 5, to provide at 40° C. an error of only 14 feet as compared to an error of 26 feet with the disc compensator, and at −45° C. strip 36 introduced an error of only 29 feet, while the disc compensator introduced an error of 53 feet. Obviously, therefore, a vastly improved and desired result has been obtained by the provision of the novel temperature means of the present invention.

In the illustrated embodiment, the novel compensating means of the present invention are shown in the form of an elongated rectangular bi-metallic strip 36 attached at its center to the flexible diaphragm 18 by means of an internally threaded nut 37 which engages the threaded portion of lug 22 which in turn passes through a central opening in the thermostatic strip 36. The thermostatic strip 36 consists of two rectangular strips 38 and 39 of dissimilar metals bonded together so that the metals each have a different temperature co-efficient of expansion. The strip 36 is attached to the diaphragm device at its center and in such a manner that its outer ends bear against the upper projection of the second corrugation of the diaphragm, whereby flexing of the thermostatic strip due to variations in temperature applies a correcting force to the diaphragm such that errors due to changes in the modulus of elasticity of the diaphragm material and errors due to changes in dimensions of the elements of the transmission mechanism are automatically compensated.

The correct amount of compensating effect to be produced by thermostatic strip 36 is obtained by adjusting nut 37 so as to initially stress the diaphragm device to impart thereto characteristics such that the errors due to temperature changes are corrected.

Adjusting nut 37 may be turned so as to cause the thermostatic strip 36, at room temperature, to press on the second central corrugation of the diaphragm 18, thereby exerting an upward pull on the center of the diaphragm, and then when the instrument is subjected to colder temperatures, the thermostatic strip will flex so that it will become slightly dished upwardly, thus permitting the center of the strip to move downwardly, thus releasing the pull on the diaphragm the required amount to produce the correct amount of compensation. The flexing and bending of the bi-metallic strip 36 as is well known in the art depends upon the variation in temperature.

It will now be apparent to those skilled in the art that novel temperature responsive means have been provided for compensating for both zero and range errors in an indicating instrument of the type having an expansible diaphragm device whereby errors due to temperature changes are corrected at all points of the scale of the instrument.

Although only one embodiment of the invention has been illustrated and described in detail, various changes in form and relative arrangement of parts which will now appear to those skilled in the art may be made without departing from the scope of the invention. Reference is, therefore, to be had to the appended claims for a definition of the limits of the invention.

What is claimed is:

1. In combination, a circular pressure responsive diaphragm device having a plurality of radially spaced corrugations, and temperature compensating means comprising an elongated temperature responsive element attached at its center to the center of said diaphragm device and having its ends in contact with the second corrugation on diametrically opposite sides of the center of said diaphragm device to produce a compensating stress on said diaphragm device varying with temperature for reducing errors of said diaphragm device due to temperature changes.

2. In combination, a circular pressure responsive diaphragm device having a plurality of radially spaced corrugations, temperature compensating means comprising an elongated temperature responsive element attached at its center to the center of said diaphragm device and having its ends in contact with the second corrugation on diametrically opposite sides of center of said diaphragm device to produce a compensating stress on said diaphragm device varying with the temperature for reducing errors of said diaphragm due to temperature changes, and means for adjusting the initial stress imposed on said diaphragm device by said element.

3. In combination, a circular pressure responsive diaphragm device having a plurality of radially spaced corrugations and temperature compensating means consisting of an elongated rectangular bi-metallic element attached at its center to the center of said diaphragm device and having its ends in contact with the second corrugation on diametrically opposite sides of the center of said diaphragm device to produce a compensating stress on said diaphragm device varying with the temperature for reducing the errors of said diaphragm device due to temperature changes.

4. In combination, a circular pressure responsive diaphragm device having a plurality of radially spaced corrugations, temperature compensating means consisting of an elongated rectangular bi-metallic element attached at its center to the center of said diaphragm device and having its ends in contact with the second corrugation on diametrically opposite sides of the center of said diaphragm device to produce a compensating stress on said diaphragm device varying with the temperature for reducing the errors of said diaphragm device due to temperature changes, and means for adjusting the initial stress imposed on said diaphragm device by said element.

5. In a pressure responsive indicating instrument, the combination of a diaphragm device having a disc portion with radially spaced corrugations, and temperature compensating means consisting of a rectangular bi-metallic strip attached at its center to the center of said diaphragm device and having its ends in contact with the second corrugation on diametrically opposite sides of the center of said diaphragm device to produce a compensating stress on said diaphragm device varying with the temperature for reducing the errors of said diaphragm device due to temperature changes.

CLETUS J. JENNY.